US008861331B2

(12) United States Patent
Abbasi et al.

(10) Patent No.: US 8,861,331 B2
(45) Date of Patent: Oct. 14, 2014

(54) LEAST MOVEMENT WSAN TOPOLOGY REPAIR METHOD

(75) Inventors: Ameer Ahmed Abbasi, Dammam (SA);
Mohamed Younis, Ellicott City, MD (US); Uthman Abdurrahman Baroudi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 203 days.

(21) Appl. No.: 13/541,470

(22) Filed: Jul. 3, 2012

(65) Prior Publication Data

US 2014/0010069 A1    Jan. 9, 2014

(51) Int. Cl.
*H04L 12/12* (2006.01)

(52) U.S. Cl.
USPC .......................................... 370/216; 370/242

(58) Field of Classification Search
CPC ....... H04L 45/00; H04L 45/02; H04L 45/122; H04L 45/22; H04L 45/28; H04L 45/48; H04L 41/0654; H04L 41/0668; H04L 2012/5627; H04Q 3/0075; H04Q 3/0079; H04Q 3/0083
USPC .................. 370/216–224, 242–248
See application file for complete search history.

(56) References Cited

U.S. PATENT DOCUMENTS

| 6,282,170 | B1 * | 8/2001 | Bentall et al. ................. 370/225 |
| 6,526,546 | B1 * | 2/2003 | Rolland et al. ........... 324/762.06 |
| 7,362,709 | B1 * | 4/2008 | Hui et al. ...................... 370/237 |
| 7,555,527 | B1 * | 6/2009 | Slaughter et al. ............. 709/213 |
| 7,933,197 | B2 * | 4/2011 | Bryant et al. ................. 370/216 |
| 2004/0004938 | A1 * | 1/2004 | Buddhikot et al. ........... 370/238 |
| 2004/0249803 | A1 * | 12/2004 | Vankatachary et al. .......... 707/3 |
| 2006/0136468 | A1 * | 6/2006 | Robison ........................ 707/102 |
| 2006/0164976 | A1 * | 7/2006 | Grover et al. ................. 370/228 |
| 2008/0151821 | A1 * | 6/2008 | Cho et al. ...................... 370/329 |
| 2009/0046587 | A1 * | 2/2009 | Kothari et al. ................ 370/238 |
| 2010/0100569 | A1 * | 4/2010 | Alexander, Jr. ............... 707/798 |
| 2011/0145578 | A1 |  6/2011 | Asano et al. |

FOREIGN PATENT DOCUMENTS

WO         WO 0152591 A1      7/2001

OTHER PUBLICATIONS

Imran, M. ; Younis, M. ; Said, A.M. ; Hasbullah, H.; "Partitioning Detection and Connectivity Restoration Algorithm for Wireless Sensor and Actor Networks." Embedded and Ubiquitous Computing (EUC), 2010 IEEE/IFIP 8th International Conference on. Publication Year: 2010, pp. 200-207.*

(Continued)

*Primary Examiner* — Thai Hoang
(74) *Attorney, Agent, or Firm* — Richard C. Litman

(57) ABSTRACT

The least movement WSAN topology repair method features an algorithm utilized in wireless sensor actor networks (WSAN) to maintain and restore connectivity following network node failure. The method is distributed throughout the WSAN nodes and relies on nodes' local view about the network. The method uses Path discovery activities in the network to determine the structure of the network topology. Upon failure of a node, the method replaces the faulty node by selecting a neighbor node belonging to the smallest disjointed block. The method is applied further recursively in case the node replacing the faulty node gets disconnected from its children, i.e., neighbors within the block, while imposing no constraints to sustain the path length between any pair of nodes at pre-failure. In this manner, the method minimizes the number of nodes relocated while also reducing message travel distance and complexity.

4 Claims, 9 Drawing Sheets

(56) References Cited

OTHER PUBLICATIONS

A. Abbasi, M. Younis and U. Baroudi, "Restoring Connectivity in Wireless Sensor-Actor Networks with Minimal Topology Changes", *Communications (ICC), 2020 IEEE International Conference on*, May 23-27, 2010, pp. 1-5.

Ameer Ahmed Abbasi, Mohamed Younis, Movement-Assisted Connectivity Restoration in Wireless Sensor and Actor Networks, IEEE Transactions on Parallel and Distributed Systems, vol. 20, No. 9, Sep. 2009.

* cited by examiner

LEAST MOVEMENT WSAN TOPOLOGY REPAIR METHOD

BACKGROUND OF THE INVENTION

1. Field of the Invention

The present invention relates to a wireless sensor-actor network (WSAN), and particularly to a least movement WSAN topology repair method.

2. Description of the Related Art

Wireless Sensor-Actor Networks (WSANs) have attracted much interest in recent years. WSANs can increase the effectiveness of numerous applications, such as homeland security, battlefield reconnaissance, space exploration, search and rescue, etc. A typical WSAN consists of a larger set of miniaturized sensor nodes reporting their data to significantly fewer actor (actuator) nodes. Sensors probe their surroundings and report their findings to one or multiple actors, which process the collected sensor reports and respond to emerging events of interest. An actor's response would depend on its capabilities, which varies based on the application and the expected role the actor plays. For example, an actor can deactivate a landmine, extinguish a fire and rescue a trapped survivor. It is worth noting that a heterogeneous set of actors may be employed and assigned complementary roles.

In most application setups, actors need to coordinate with each other in order to share and process the sensors' data, plan an optimal response and pick the most appropriate subset of actors for executing such a plan. For example in forest monitoring applications, such actors as fire trucks and flying aircraft need to collaborate with each other in order to effectively control a fire and prevent it from spreading. The selection of actors that need to be engaged can be based on many factors, such as the actor's capabilities, the actor's proximity to the detected event, and the actor's current load. All of these factors would require a frequent update of the actor's state. To enable such interactions, actors need to stay reachable to each other. In other words, a connected inter-actor network has to be maintained at all times.

An actor's failure can cause the loss of multiple inter-actor communication links and may partition the network if alternate paths among the affected actors are not available. Such a scenario will hinder the actors' collaboration, and thus have very negative consequences on the WSANs application. Therefore, the actors should be able to detect and recover from the failure of one of them. Given that the WSAN usually operates autonomously and unattended, the recovery should be a self-healing process for the network and should be performed in a distributed manner. In addition, the network recovery should be both quick and lightweight. Rapid recovery is desirable in order to maintain the WSAN responsiveness to detected events. In addition, the overhead should be minimized in order to ensure the availability of actors' resources for application-level missions.

However, actors are responsible for responding to the specific events and carry out tasks that must be consistent with the application goals. Therefore, unconstrained movement of the actor(s) with the goal of achieving efficiency in terms of reduced overhead can cause a serious failure at application level. In other words, an application unaware of recovery of the inter-actor connectivity can be impractical in many scenarios. For example, consider the following scenario where an application unaware recovery of the inter-actor connectivity can lead to a disastrous situation.

Life support medical units are unmanned robotic vehicles that are equipped with the necessary life support equipment, such as oxygen tanks and masks. These actor units are deployed in an area that got hit by a natural disaster, such as earthquake, hurricane, etc. Human body heat sensors are also deployed all over the area. The job of these sensors is to probe the existence of a live human being in the vicinity and report it to the actors. After receiving such a report, close-by actors are responsible to reach the location and provide necessary life support until the rescue team arrives. At the time when a unit (actor) is busy in providing emergency help to a survivor under the rubbles, task termination and the mobility of this unit may cause serious damage to the operation. However, after completing the operation, the unit can be mobilized to any location without constraints. Thus, a recovery mechanism is needed to determine the best connectivity restoration scheme under application-level task termination constraints. On the other hand, most of the recently proposed schemes found in the literature require every node to maintain partial knowledge of the network state. To avoid the excessive state-update overhead and to expedite the connectivity restoration process, these schemes rely on maintaining 1- or 2-hop neighbor lists and predetermined criteria for a node's involvement in the recovery. Nonetheless, 1-hop based schemes often impose high node repositioning overhead, and the repaired inter-actor topology using 2-hop schemes may differ significantly from its pre-failure status.

However, some WSAN applications require timely coordination among the actors. For example, during a combat operation, timely interaction among actors would be required in order to accurately track and attack a fast moving target. Thus, extending the shortest path between two actors as a side effect of the recovery process would not be acceptable. Therefore, a novel network restoration scheme is required.

In some mission critical applications, node movement is not much appreciated, and moving many actor nodes as a side effect of the recovery process could lead to an application mission failure. For example, moving away a number of actor nodes while busy extinguishing a fire or life supporting natural disaster victims could lead to a disaster. Hence, a recovery algorithm is needed that strives to relocate the least number of nodes and reduce the total travel distance and communication overhead. Consequently, there remains the problem of how to reconfigure WSAN when a particular node or set of nodes fails.

Thus, a least movement WSAN topology repair method solving the aforementioned problems is desired.

SUMMARY OF THE INVENTION

The least movement WSAN topology repair method features an algorithm utilized in wireless sensor networks (WSN) to maintain and restore connectivity following network node failure. The method is distributed throughout the WSN nodes and relies on a node's local view about the network to relocate the least number of nodes and ensure that no path between any pair of affected nodes is extended relative to its pre-failure status. Upon failure of a node, the method performs a connectivity restoration procedure that includes minimizing the number of nodes relocated, while also reducing message travel distance and complexity. Unlike conventional schemes that maintain 1- or 2-hop neighbor lists, the present repair method utilizes existing path discovery activities in the network to determine the structure of the network topology. Thus, the imposition of additional pre-failure communication overhead is avoided. The method is recursively applied to maintain network connectivity, while imposing no constraints to sustain the path length between any pair of nodes at pre-failure.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
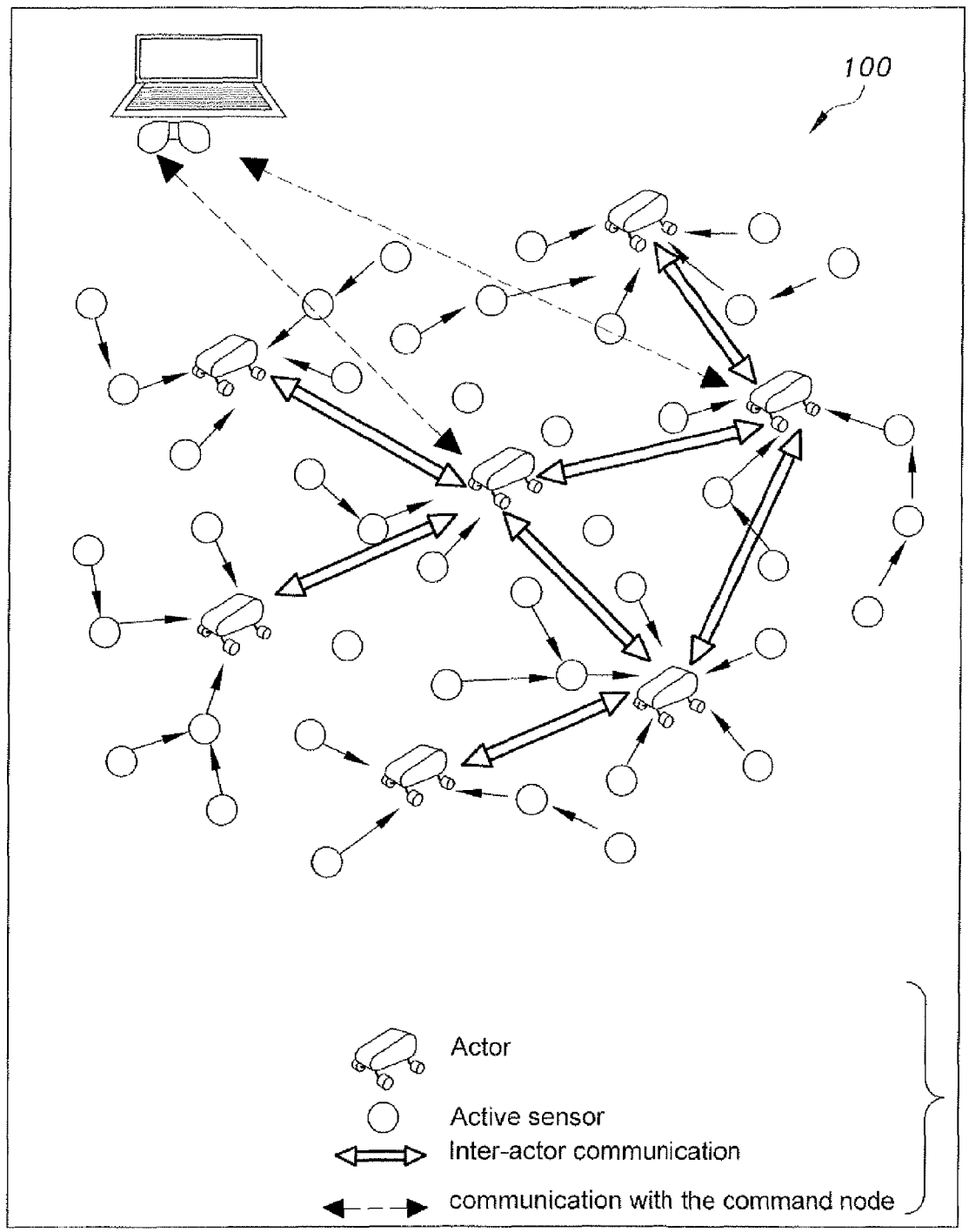
FIG. 1 is a schematic diagram of a typical wireless sensor-actor network (WSAN).

Referring now to FIG. 1, a typical wireless sensor actor network (WSAN) 100 is depicted. Within each of the nodes resides software implementing a least movement WSAN topology repair method (LeMoToR), which features an algorithm that is computer-implemented, having computer readable instructions stored on non-transitory media, such as computer Read Only Memory (ROM), computer disk, computer hard drive, FLASH memory, EEPROM memory, and the like, and is utilized in wireless sensor actor networks (WSAN) to maintain and restore connectivity following network node failure. The computer-implemented method is distributed throughout the WSAN nodes and relies on each node's local view about the network. The method uses Path discovery activities in the network to determine the structure of the network topology. In graph theory, a biconnected component (or 2-connected component) is a maximal biconnected subgraph. Any connected graph decomposes into a tree of biconnected components, called the block tree of the graph. The blocks are attached to each other at shared vertices, called cut vertices or articulation points. A "cut vertex" is any vertex that when removed, increases the number of connected components. In the present method, upon failure of a node, the faulty node is replaced by selecting a neighbor node belonging to the smallest disjointed block. The method is applied recursively, in case the node replacing the faulty node gets disconnected from its children, i.e., neighbors within the block, while imposing no constraints to sustain the path length between any pair of nodes at pre-failure. In this manner, the method minimizes the number of nodes relocated, while also reducing message travel distance and complexity.

Figure 2:
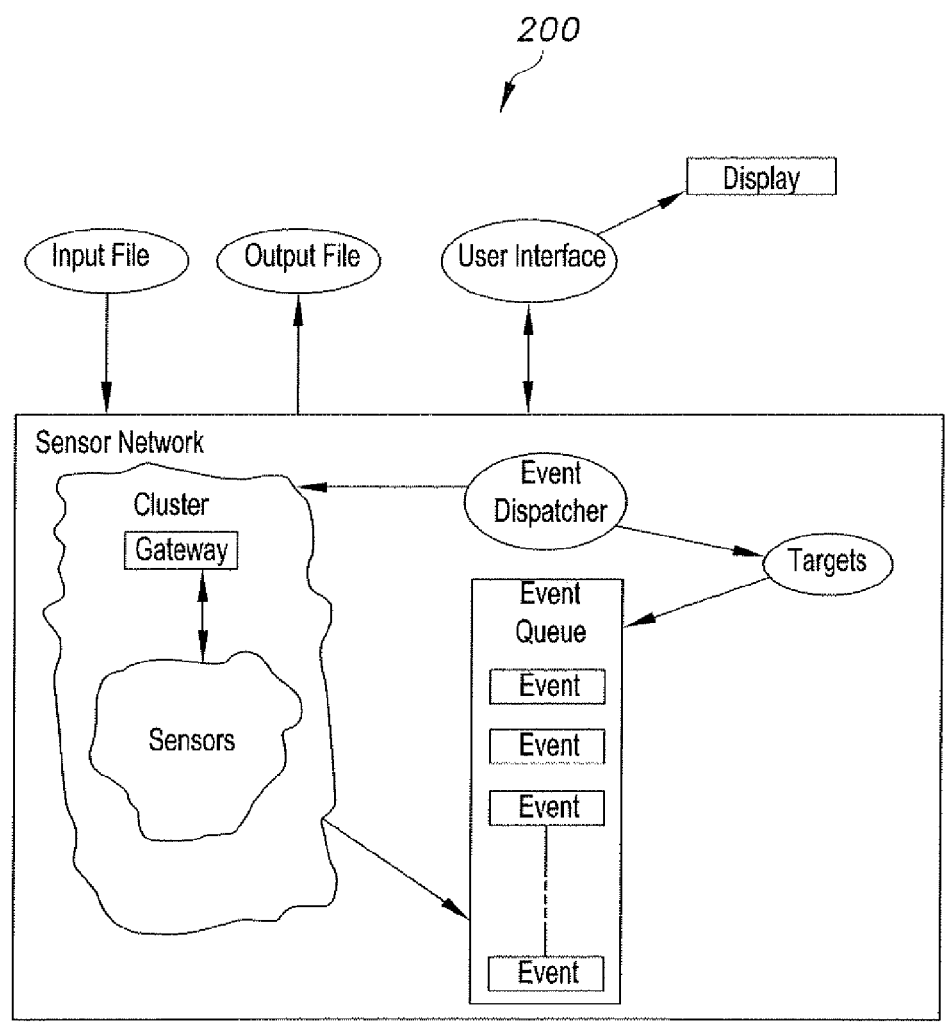
FIG. 2 is a block diagram showing a WSAN simulator used in testing the least movement WSAN topology repair method according to the present invention.

As shown in FIG. 2, a simulator tool 200 used to test the method is actually a framework for general wireless sensor-actor networks. It provides an extensive framework to simulate the basic entities in the sensor-actor network. These entities are the sensor nodes, gateways (actors), packets, routes, targets etc. The basic characteristics of these entities, such as communication range, action range, energy level, etc., are also enumerated, and a software equivalent is provided. A mechanism is provided to establish communication pathways between these pre-defined entities. As a whole, a typical wireless sensor-actor network includes the following independent entities: Sensor nodes, Gateways (actors), Clusters, Packets, Packet Queues, Targets, User-interface, Events, and Event Queues.

An object-oriented design approach is used to design the simulator 200, where each entity is modeled by a separate object that encapsulates its functionality. These objects represent a high-level decomposition of the sensor network, allowing us to establish the interactions between the entities. At a lower level, each object is assigned attributes to capture the characteristics of the entity it is encapsulating. The interactions that were established earlier are then each assigned as methods to the object.

An intuitive and very useful feature is a graphical user interface (GUI) of the simulator. An animated display of the working of the simulator provides a valuable visual clue to the events taking place in the sensor network. The following features of the WSAN can be seen on the GUI: the positions of all the sensor nodes and gateways (actors); the states of the nodes, e.g., whether they are turned on or off, whether they are dead, etc.; communication between the nodes and the gateways (actors); the communication routes that are established by the gateways (actors) in the network; and inter-gateway (actor) network connectivity.

In the simulation experiments, 1-connected network topologies have been created. Actors are placed in an area of 1000 m×600 m using a uniform random distribution. For the least movement WSAN topology repair method, a shortest path routing table (SpRT) is formed using the Floyd-Warshall algorithm, a graph analysis algorithm for finding shortest paths in a weighted graph, which is a technique known by persons having ordinary skill in the art. This implies that every node is aware of the entire network topology.

Let α be the percentage of entries, i.e., routes between actor pair (i,j), that each node has acquired over time. Hereafter, we shall call this a the Confidence Level (CL). For example, if 50% of the entries of node Ai's routing table are filled, we say node Ai has a 50% CL. We mimic the effect of the Confidence Level (CL) (during the simulation experiments) by randomly removing (1−α)% of entries from the copy of the global SpRT stored at the individual nodes in order to capture the performance of a distributed implementation. In the WSAN simulation for testing the present least movement WSAN topology repair method, all cut-vertex nodes in the topology are identified and one of them is randomly picked as the failed node. Then the proposed least movement WSAN topology repair method is applied to restore connectivity.

The following parameters are used to vary the characteristics of the WSAN topology in the experiments. The Number of Deployed Actors (N) is a parameter that affects the node density and the WSAN connectivity. Increasing the value of N makes the WSAN topology highly-connected. When studying the effect of network size, the number of actors has been varied from 20 to 100 while fixing the radio range (r=100 m). The Communication range (r) is another parameter. All actors have the same communication range r. The value of r affects the initial WSAN topology. While a small r creates a sparse topology, a large r boosts the overall network connectivity. In the experiments, the node count has been fixed at 100, while varying the communication range (25 m to 200 m).

For each simulation setup, 30 different network topologies are considered and the average values are reported. We observed, with 90% confidence level, that the simulation results stay within 6%-10% of the sample mean.

In the simulator, the underlying physical channel in the simulation environment is considered reliable and no message loss is observed. All the nodes, i.e., sensors and actors, are distributed in an open space area where radio coverage is expected to be circular. The sensor and actor antennae are omnidirectional. It is worthwhile to note that the circular radio coverage assumption is widely used in the literature.

Upon deployment, actors are assumed to discover each other and form a connected network using some of the existing techniques known to persons having ordinary skill in the art. An actor employs ranging technologies and localization techniques in order to determine its position relative to its neighbor. It is assumed that the actors can move on demand in order to perform tasks on larger areas or to enhance inter-actor connectivity. Given the application-based interaction, an actor is assumed to know how many actors are in the network. Without loss of generality, all actor nodes are assumed to have the same radio/communication range, which is limited, and that the communication links are symmetric. However, the proposed least movement WSAN topology repair method does not require such an assumption.

In order to evaluate the performance of the present least movement WSAN topology repair method, the overhead of the recovery process is quantified using the following two metrics. Total Distance Traveled is a metric that reports the sum of the distances traveled by the individual actors during the recovery. It indicates the overhead energy incurred and is envisioned as a network-wide assessment of the efficiency of the applied recovery scheme. The Number of exchanged message: tracks the total number of messages that have been exchanged among nodes. This metric captures the communication-related overhead.

Most of recovery schemes that required just 1-hop neighbor information are not efficient, since they often involve many actors and require long travel distances. The least movement WSAN topology repair method utilizes existing path discovery activities to get and maintain topology related information and imposes no additional pre-failure communication overhead. The routing cost is not counted towards communication overhead of the proposed algorithm, since data has to be routed anyway, regardless of whether the present method is applied or not. The least movement WSAN topology repair method relies on the local view of a node about the network to orchestrate an autonomous restoration of the strong connectivity. On the other hand, the least movement WSAN topology repair method does not impose a constraint to sustain the path length between any pair (i, j) of nodes at pre-failure status. The objectives are to minimize the node relocation total travel distance and communication overhead. The least movement WSAN topology repair method opts to localize the recovery process and operates in a distributed manner. When a node fails, its neighbors will individually consult their possibly-incomplete routing table to decide on the appropriate course of action and define their role in the recovery, if any. If the failed node is a cut-vertex, i.e., a node that causes the network to partition into disjoint blocks, the neighbor node that belongs to the smallest block reacts. The least movement WSAN topology repair method is applied recursively to sustain the intra-smallest-block connectivity. When a node moves, its neighbors repeat the least movement WSAN topology repair connectivity restoration process. In brief, the goal of least movement WSAN topology repair method is to reconnect the disjoint network while keeping the node movement as minimal as possible, and while involving the least number of actor nodes in the recovery process.

To detect a node failure in the neighborhood, an exchange of heartbeat messages is assumed in the network. After n missing heartbeats, a node F would be assumed faulty. If the failed node F is a cut-vertex, network recovery measures would be triggered on the 1-hop neighbors of F. Cut-vertex (critical node) detection is done by using the SpRT.

As mentioned earlier, after a cut-vertex (critical node) failure, the 1-connected network G is split into more than one connected component, i.e., sub-networks, denoted sub(G). Each sub(G) includes several nodes of G that are 1-connected to each other within the sub(G). Basically, each sub(G) is a separate "block" that was connected to the other blocks in G via a faulty cut-vertex. The least movement WSAN topology repair method attempts to find a block among the disjoint blocks having the least number of nodes, referred to hereafter as the "smallest block". Actually, the least movement WSAN topology repair method aims to confine the node movement within the smallest block to minimize the node movement. To identify the smallest block, every 1-hop neighbor of the faulty node would identify the reachable set of nodes for itself and every other 1-hop neighbor of the failed node by using the shortest path routing table (SpRT). The block with the fewest nodes is identified as a smallest block.

To replace the faulty node F, a neighbor node J is selected from the smallest block. The reason is that the least movement WSAN topology repair method strives to minimize the number of node movements during the network recovery. Since the least movement WSAN topology repair method is recursive in nature, moving a node and its children from the smallest block would most probably involve the fewest actor nodes in the recovery. In case more than one actor with such characteristics exists, the closest actor to the faulty node would be picked. Any further ties will be resolved by selecting the actor with the least ID.

When node J moves to replace the faulty node, possibly some of its children will become disconnected. To regain the connectivity, children would assume the moved parent node is a dead node and would apply the least movement WSAN topology repair method at the children level. The smallest block at the children level would be identified. The child that belongs to the smallest block would proceed to the location of the already moved parent node. This phenomenon would continue until all the nodes are reconnected with the network G.

Figure 3A:
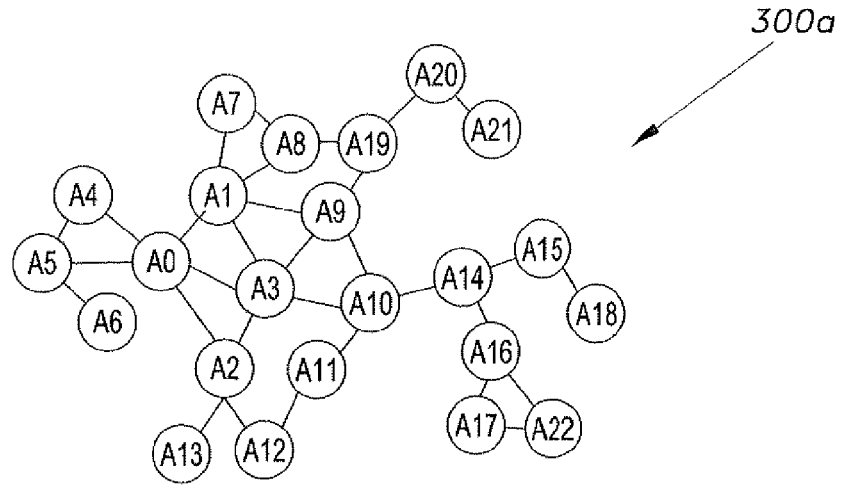
FIG. 3A is a schematic diagram showing connectivity between sensor nodes in the intact, prefailure WSAN.
Figure 3B:
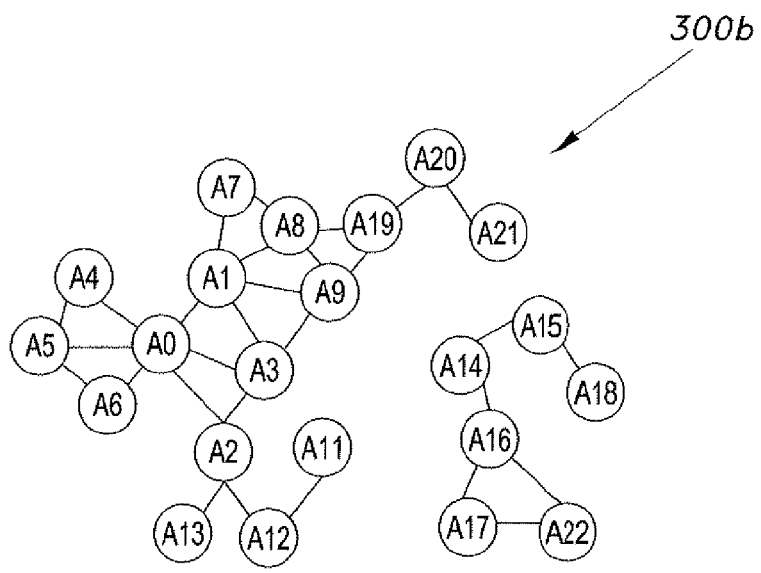
FIG. 3B is a schematic diagram of the WSAN of FIG. 3A, showing the break in connectivity upon failure of Actor Node 10.
Figure 3C:
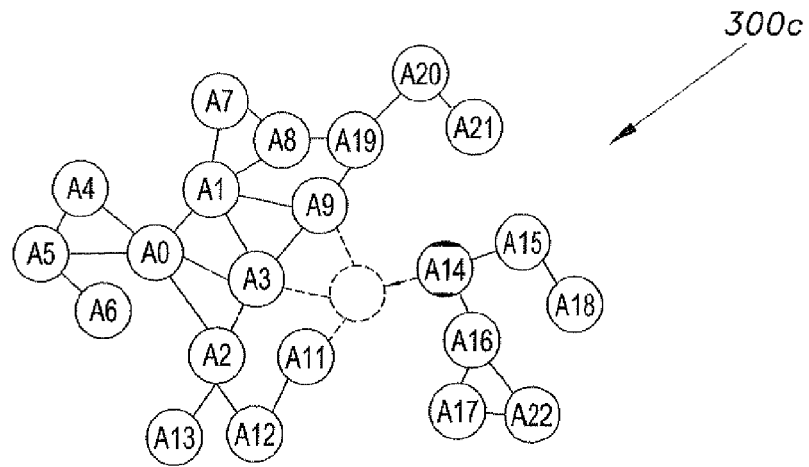
FIG. 3C is a schematic diagram showing the state of the network after a first step of a least movement WSAN topology repair method according to the present invention.
Figure 3D:
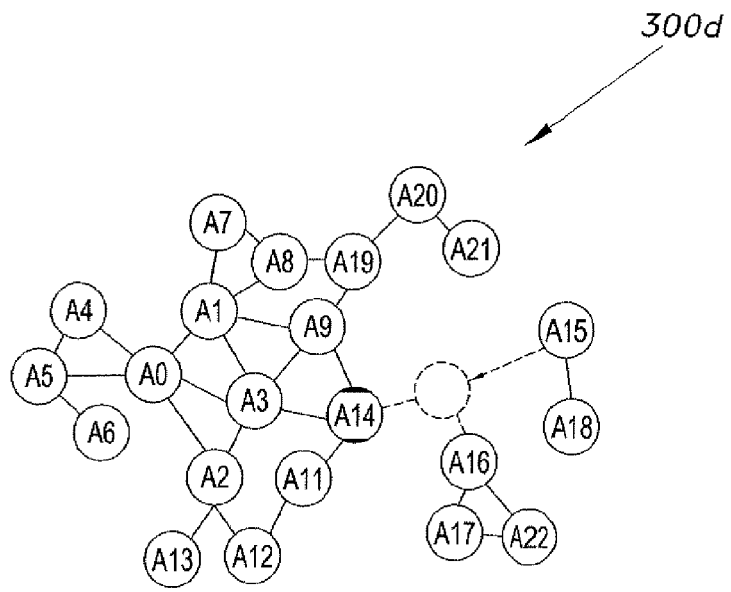
FIG. 3D is a schematic diagram showing the state of the network after a second step of a least movement WSAN topology repair method according to the present invention.
Figure 3E:
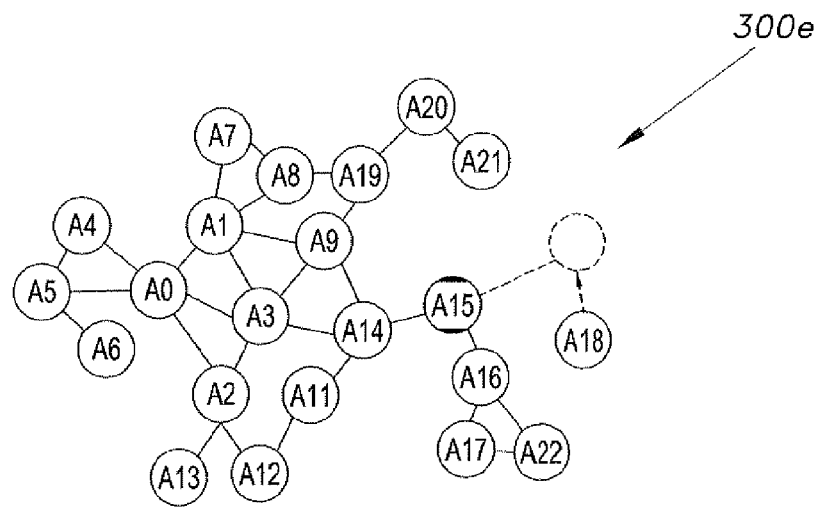
FIG. 3E is a schematic diagram showing the state of the network after a third step of a least movement WSAN topology repair method according to the present invention.
Figure 3F:
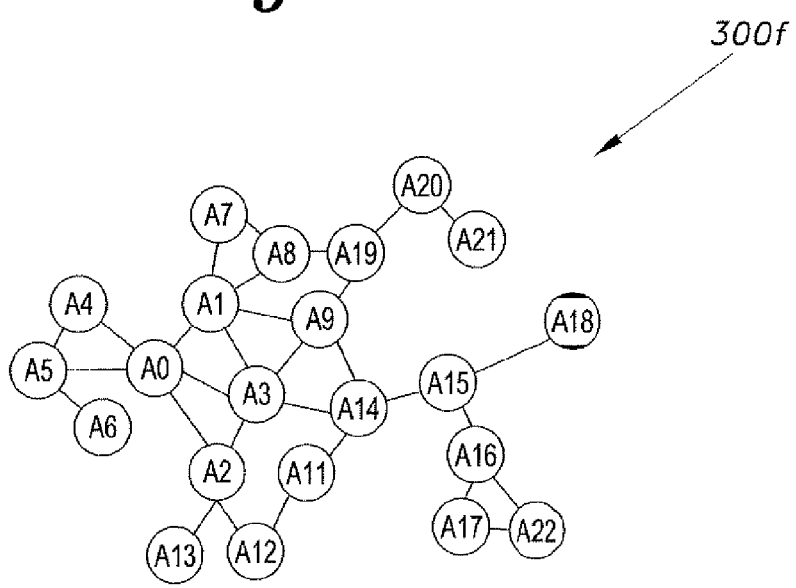
FIG. 3F is a schematic diagram showing the state of the network after a final step of a least movement WSAN topology repair method according to the present invention.

Schematic diagrams 300a-300f of FIGS. 3A-3F, respectively, show an example for how the least movement WSAN topology repair method restores connectivity after the failure of node A10. Node A10 is a cut-vertex, and node A14 becomes the 1-hop neighbor that belongs to the smallest block (FIGS. 3A-3C). In FIG. 3D, node A14 notifies its neighbors and moves to the position of node A10 to restore connectivity. Disconnected children, nodes A15 and A16, execute the least movement WSAN topology repair method again to find out which one of them should move to the location of A14. Node A15 belongs to the smallest block and, thus, moves to the location of A14 to maintain the communication link (see FIG. 3E). Note that the reason to execute the least movement WSAN topology repair method recursively and to identify the smallest block, even among the movement of child nodes, is to minimize the overall node movement. Node A15 would notify its only child A18 before it moves. Since A18 is the only child node, it simply belongs to the smallest block and moves to location of A15 (shown in FIG. 3F). FIG. 3F shows the repaired network.

In a distributed implementation of the least movement WSAN topology repair method, every node in the topology may potentially have a different CL from others. In such a case, upon the detection of a node failure, the neighboring nodes may have an inconsistent assessment of the impact of the node loss on the network and on which actor is the best candidate for leading the recovery. We argue, nonetheless, that this is rare in practice, since the mobility pattern among actors is not typically high, given their involvement in actuation activities. In addition, operations in a WSAN are collaborative in nature, and an actor usually communicates with many others, and thus the routing table would not be sparse.

The second issue is determining the best candidate, i.e., the neighbor of the failed node that belongs to the smallest block. In case a neighbor of the faulty node that belongs to the smallest block does not have sufficient entries in its shortest path routing table, it would not know that it belongs to the smallest block, and thus would not initiate the recovery process by moving to replace the faulty node. Since the neighbors of faulty node cannot reach each other, a partially populated shortest path routing table may lead to a deadlock, with none of the neighbors of faulty node responding to the failure and leaving the network disconnected. To handle this issue, the least movement WSAN topology repair method imposes a time-out, after which the neighbor(s) belonging to the second largest block will move. In such circumstances, potentially multiple neighbors may be moving towards faulty node. To avoid having more than one actor replacing the faulty node, the least movement WSAN topology repair method requires these nodes to broadcast messages with their ID so that they pause as soon as they reach other neighbors of the faulty node that happen to be in a different block. The pause time would allow these neighbors to negotiate and pick the best candidate to continue on to the position of the faulty node.

Table 1 shows the pseudocode of the least movement WSAN topology repair method. A node J would trigger the least movement WSAN topology repair method whenever a cut-vertex node failure is detected in the 1-hop neighborhood (lines 1-2). Node J would test its eligibility to move to replace the faulty node by executing the IsBestCandidate( ) procedure (line 3). Basically, the procedure IsBestCandidate( ) finds whether node J belongs to the smallest disjointed sub-network block. If so, node J notifies its children (lines 4-10) and moves to the location of the faulty node. Otherwise, node J checks whether it is to perform a movement to sustain current communication links (line 11), and if so, it recursively executes the least movement WSAN topology repair method (line 15) to find whether it belongs to the smallest block. If so, it moves to the location of the already moved parent node to maintain the communication link. Nodes only move once (lines 12-14). The least movement WSAN topology repair method would be executed on the children nodes that lose direct communication link to the moved parent (neighbor).

TABLE 1

Least Movement WSAN Topology Repair Method Pseudocode

| Line No. | LeMoToR Pseudocode |
|---|---|
| // | Every node builds its shortest path routing table (SpRT) based |
| // | on the route discovery activities that it initiates or serves in, e.g., |
| // | while executing a distributed routing protocol. |
| | LeMoToR(J) |
| 1 | IF node J detects a failure of its neighbor F |
| 2 | IF neighbor F is a cut-vertex node |
| 3 | IF IsBestCandidate(J) |
| 4 | Notify_Children(J); |
| 5 | J moves to the Position of neighbor F; |
| 6 | Moved_Once ← TRUE; |
| 7 | Broadcast(Msg('RECOVERED')); |
| 8 | Exit; |
| 9 | END IF |
| 10 | END IF |
| 11 | ELSE IF J receives (a) notification message(s) from F |
| 12 | IF Moved_Once ‖ Received Msg('RECOVERED') |
| 13 | Exit; |
| 14 | END IF |
| 15 | LeMoToR(J) |
| 16 | END IF |
| | IsBestCandidate (J) |
| // | Check whether J is the best candidate for tolerating the failure |
| 17 | NeighborList[ ] ← GetNeighbors(F) accessing the column F in SpRT; |
| 18 | SmallestBlockSize ← Number of nodes in the network; |
| 19 | BestCandidate ← J; |
| 20 | FOR each node i in the NeighborList[ ] |
| // | Use the SpRT after excluding the failed node to find the |
| // | set of reachable nodes; |
| 21 | Number of reachable nodes ← 0; |
| 22 | FOR each node k in SpRT excluding i and F |
| 23 | Retrieve shortest path from i to k by using SpRT; |
| 24 | IF the retrieved shortest path does not include node F |
| 25 | No. of reachable nodes ← No. of reachable nodes + 1; |
| 26 | END IF |
| 27 | END FOR |
| 28 | IF Number of reachable nodes < SmallestBlockSize |
| 29 | SmallestBlockSize ← Number of reachable nodes; |
| 30 | BestCandidate ← i; |
| 31 | END IF |
| 32 | END FOR |
| 33 | IF BestCandidate == J |
| 34 | Return TRUE; |
| 35 | ELSE |
| 36 | Return FALSE; |
| 37 | END IF |

The performance of the least movement WSAN topology repair method is validated through simulation. As we mentioned earlier the least movement WSAN topology repair method strives to restore the network connectivity while minimizing the number of relocated nodes. The movement technique and operation of the least movement WSAN topology repair method is designed particularly to restore the network connectivity with minimum messaging overhead.

Figure 4:
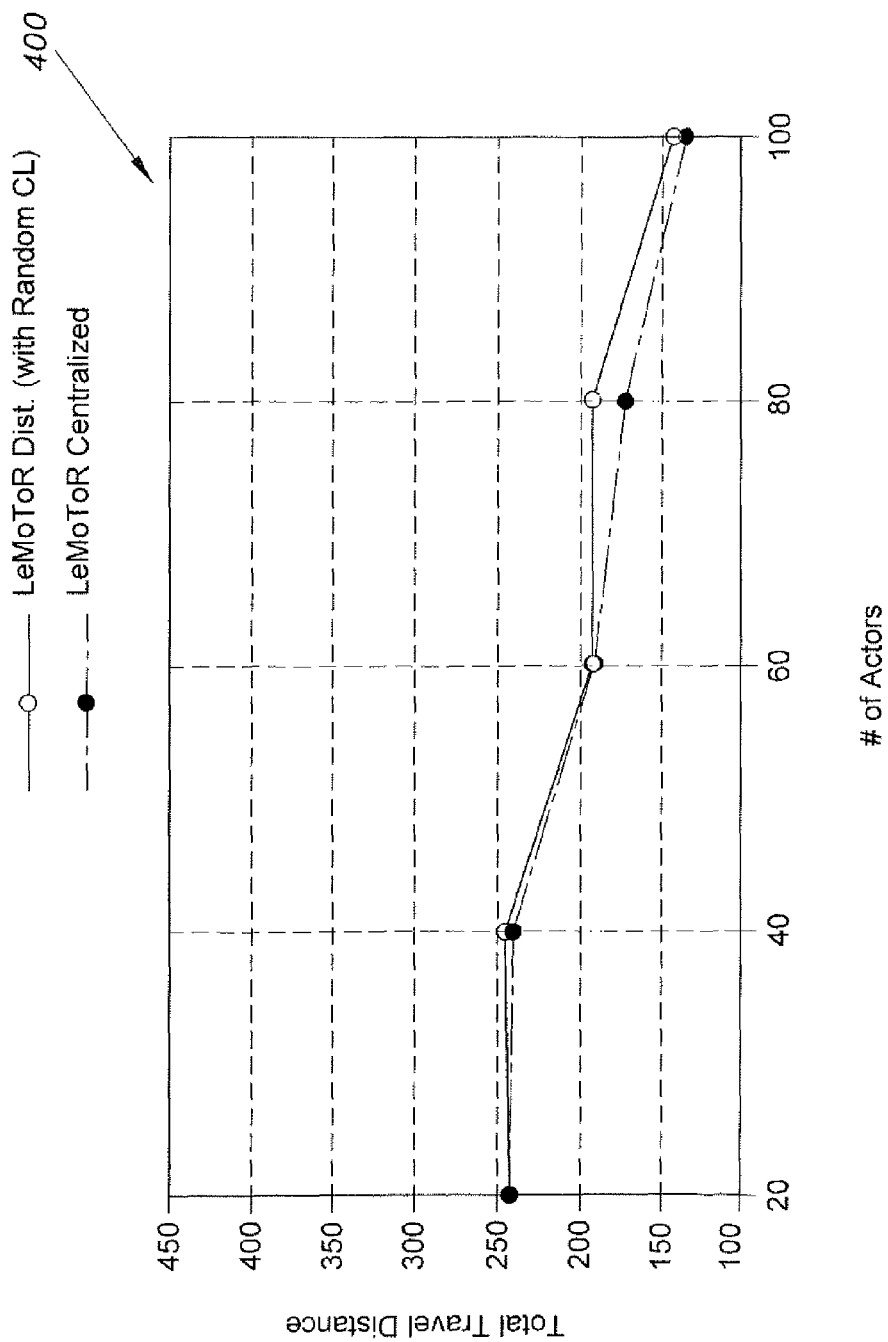
FIG. 4 is a plot showing an exemplary total travel distance vs. number of actors plot for a least movement WSAN topology repair method according to the present invention.
Figure 5:
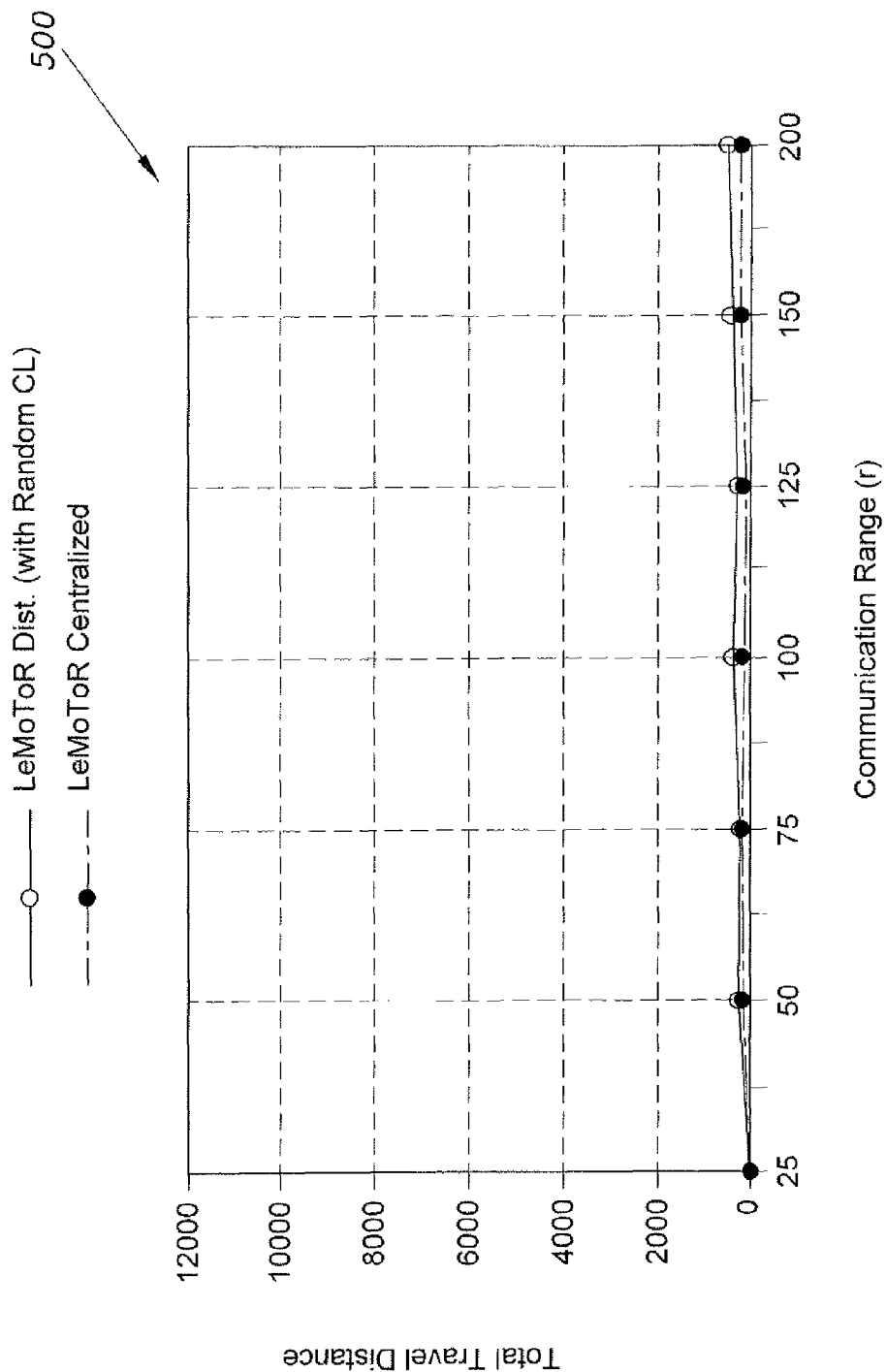
FIG. 5 is a plot showing an exemplary total travel distance vs. communication range for a least movement WSAN topology repair method according to the present invention.

Plots 400 and 500 of FIGS. 4 and 5, respectively, show the total travelled distance overhead under all considered approaches. It clearly indicates that the least movement WSAN topology repair method scales well as the network gets larger. Considering the effect of communication range on the total travelled distance, plot 500 of FIG. 5 shows that the least movement WSAN topology repair method has a very stable behavior and confirms the previous finding of minimum travelled distance. The efficiency of the least movement WSAN topology repair method depends on the network traffic and activities, since it directly affects how the shortest path routing table is populated. Nonetheless, the least movement WSAN topology repair method does still converge, even if only a partial shortest path routing table is available.

As stated earlier, the decrease in the CL level means fewer entries in the actor's shortest path routing table and less information for the actor to make the right assessment of the scope of the failure and define the most appropriate recovery plan. This leads to an increase in the likelihood of wrong decision making and results in more travel overhead. We noticed that this happens when the number of entries in the shortest path routing table is below 30% for all the nodes in the topology, which is very rare. However, FIGS. 4 and 5 show that the least movement WSAN topology repair method stays robust and yields results close to optimal with random CL. In other words, despite the incomplete shortest path routing table that some nodes have, the performance of the present least movement WSAN topology repair method matches the centralized implementation that bases the decision on knowing the entire network topology.

While simulating the least movement WSAN topology repair method, initially we assume that all the nodes are deployed together and thus have almost the same confidence level (CL). In other words, all nodes are placed in the topology with the same number of shortest path routing entries in their shortest path routing tables. Furthermore, we have tested the performance of the least movement WSAN topology repair method with heterogeneous CL, which means that in the same topology, some nodes are missing 30% SpRT entries, some nodes are missing 50% SpRT entries, and some nodes are missing 70% SpRT entries, This mimics the case when nodes are deployed in batches, and also the case when the traffic density is different throughout the network. In FIGS. 4 and 5, the curves for the least movement WSAN topology repair method with Random CL reflect performance with heterogeneous CL values, and the results are very close to those of centralized implementations.

Figure 6:
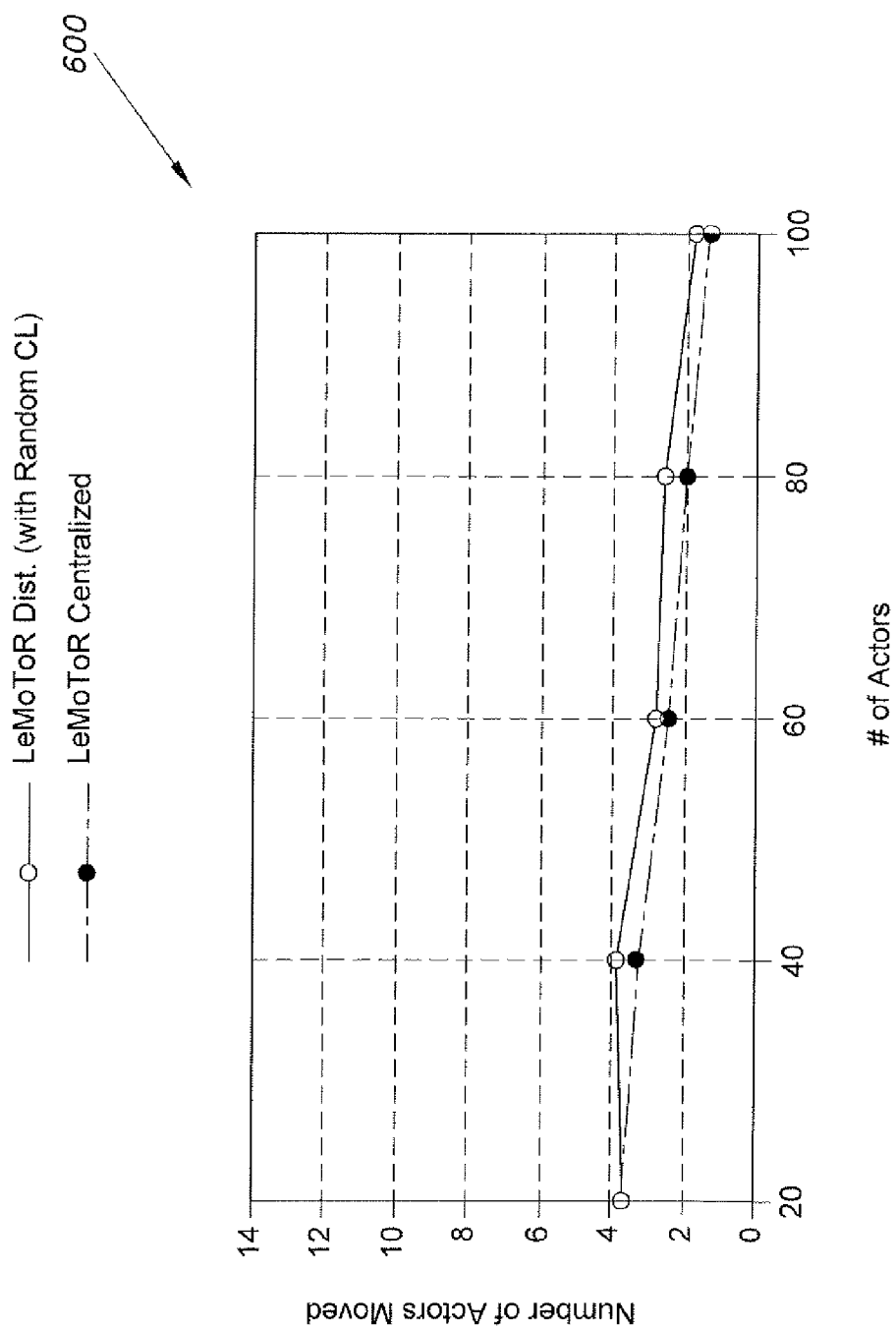
FIG. 6 is a plot showing an exemplary number of actors moved vs. number of actors for a least movement WSAN topology repair method according to the present invention.
Figure 7:
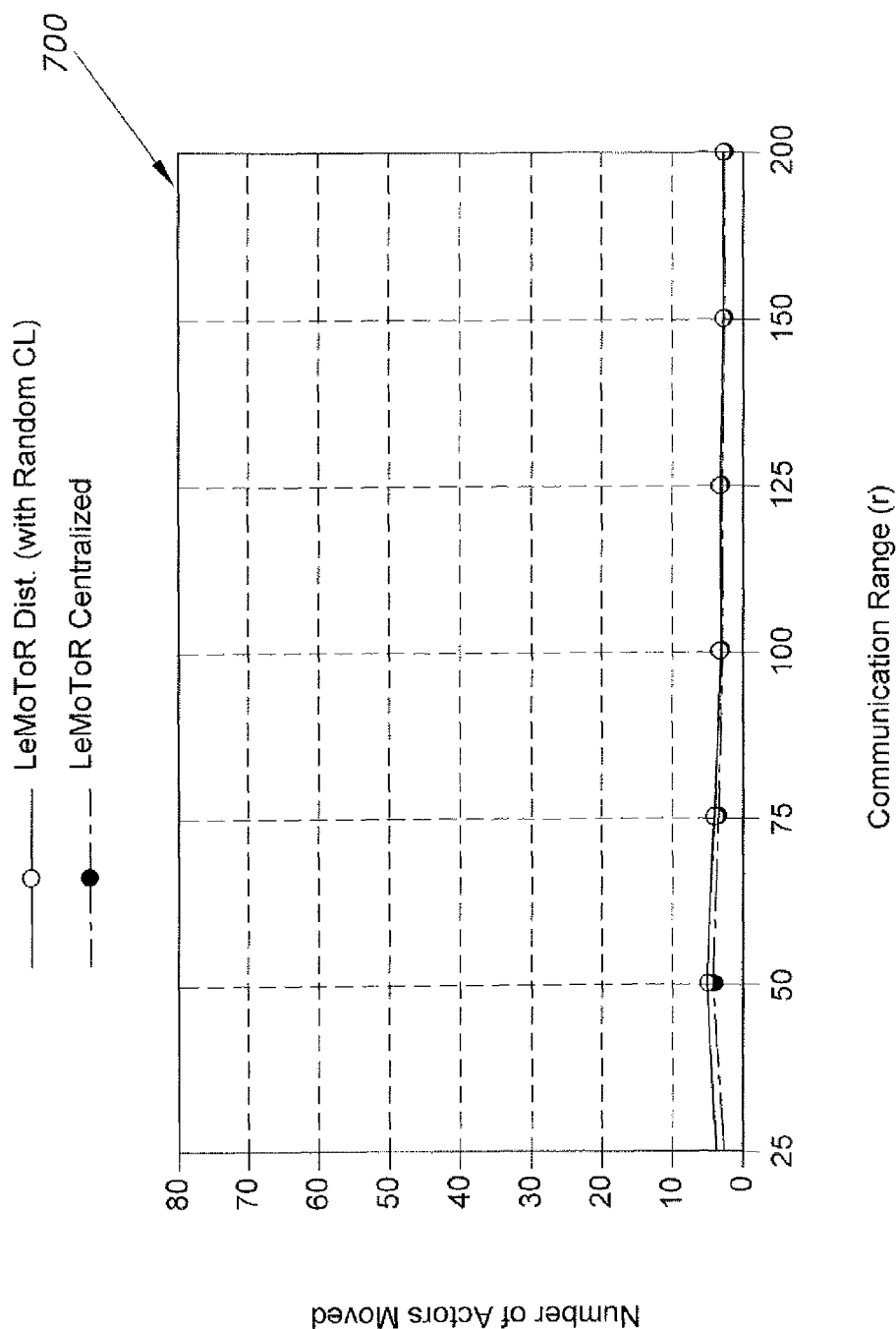
FIG. 7 is a plot showing an exemplary number of actors moved vs. communication range for a least movement WSAN topology repair method according to the present invention.

Considering the number of relocated nodes during the recovery process, plots 600 and 700 of FIGS. 6 and 7, respectively, indicate clearly that the present least movement WSAN topology repair method performs well by moving few nodes during the recovery, especially for dense and highly connected topologies. The least movement WSAN topology repair method tries to relocate nodes that belong to the smallest block in order to avoid triggering large scale movement of child actors. Furthermore, the least movement WSAN topology repair method extends the application of this mechanism to all child actors. This feature makes the least movement WSAN topology repair method relocate the least number of actor nodes among contemporary approaches.

TABLE 2

Message Overhead By Number of Actors

| # of Actors | Central. No. of Messages Sent | Dist. Rand. CL No. of Messages Sent |
|---|---|---|
| 20 | 402.8 | 4.6 |
| 40 | 1604.2 | 6.2 |
| 60 | 3605.75 | 5.2 |
| 80 | 6401.1 | 5.8 |
| 100 | 10010.5 | 6.1 |

TABLE 3

Message Overhead By Range

| Radio Range (meters) | Central. No. of Messages Sent | Dist. Rand. CL No. of Messages Sent |
|---|---|---|
| 25 | 10005.4 | 8 |
| 50 | 10004.6 | 10.4 |
| 75 | 10007.4 | 10.6 |
| 100 | 10011.8 | 16.7 |
| 125 | 10010.2 | 12.8 |
| 150 | 10015 | 14.4 |
| 200 | 10018.9 | 50.5 |

With respect to the number of messages, again the least movement WSAN topology repair method does very well by introducing noticeably less messaging overhead, as shown in Table 2 and 3. The least movement WSAN topology repair method leverages the available route discovery process and does not impose pre-failure messaging overhead. The only communication cost incurred during the recovery is when a node informs its children about its movement or broadcasts the successful relocation. Nevertheless, the least movement WSAN topology repair method requires few messages.

The collaborative and autonomous operation of the actors requires sustaining connectivity at all time, and thus an actor failure must be tolerated in a distributed manner while imposing the least overhead. The least movement WSAN topology repair method relies only on the local view of the network and does not impose pre-failure overhead. The performance of the least movement WSAN topology repair method has been validated through extensive simulation experiments. The least movement WSAN topology repair method (LeMoToR) relocates the least number of actors to reestablish network connectivity after failure. LeMoToR 10 also works very well in dense networks and matches the performance of the centralized implementation despite the partial knowledge that the nodes have about the network topology.

We assume that every node is aware of the entire network topology prior to the failure, and thus can build the SpRT for every pair of nodes. However, this assumption is eliminated later. Without loss of generality, hop count is used to calculate the inter-actor path cost.

In addition, the following node movement related performance metric is used in LeMoToR, namely, Number of relocated nodes, which reports the number of nodes that moved during the recovery. This metric assesses the impact of the restoration algorithm on the ongoing activities by other actors, as well as the scope of the connectivity restoration within the network.

A WSAN may get partitioned into disjoint segments if a critical actor, i.e., a cut-vertex node, fails and causes the loss of multiple inter-actor communication links. In such a case, inter-actor collaboration would not be possible and would most probably cause a fatal error/failure to the entire application mission. Since WSAN applications work autonomously and unattended, actors must have a quick, lightweight, self-healing and localized mechanism to deal with such a situation. Actors are responsible for responding to the specific events and carry out tasks which must be consistent with the application goals. Therefore, unconstrained movement of actor(s) with the goal of achieving efficiency, in terms of reduced overhead, can cause a serious failure at application level. In other words, an application unaware recovery of the inter-actor connectivity can be impractical in many scenarios.

It is to be understood that the present invention is not limited to the embodiments described above, but encompasses any and all embodiments within the scope of the following claims.

We claim:

1. In a wireless sensor-actor network (WSAN) having a topology defined by a plurality of connected sensor nodes and actor nodes, the WSAN being modeled by a weighted graph having a plurality of edges connecting the sensor and actor nodes, a plurality of weights of the graph being assigned to the edges, the weights representing distances of the edges connecting the nodes, a computer-implemented least movement wireless sensor-actor network (WSAN) topology repair method, comprising the steps of:

using available weights, building a shortest path routing table for each of the actor nodes in the WSAN, thereby allowing each of the actor nodes to be aware of an entire topography of the WSAN, wherein no constraints are applied to path lengths between pairs of actor nodes;
 for each of the actor nodes, determining whether a neighbor actor node has failed;
 when one of the neighbor actor nodes has failed, determining whether the failed neighbor actor node is a cut-vertex node;
 using the shortest path routing table, determining a failure replacement best candidate actor node for the failed neighbor actor node if the failed neighbor actor node is a cut-vertex node by recursively identifying a smallest block of the WSAN topology from which the best candidate actor node is selected for replacement of the failed neighbor actor node;
 moving the best candidate actor node to a locus proximate the failed cut-vertex node, thereby replacing the failed cut-vertex node;
 notifying all child nodes belonging to the best candidate actor node that the best candidate actor node is moving to the failed neighbor actor node's proximity and is replacing the failed neighbor actor node; and
 broadcasting a node-recovered message to the remaining actor nodes in the WSAN.

2. The computer-implemented least movement WSAN topology repair method according to claim 1, wherein said step of building the shortest path routing table further comprises the step of using a Floyd-Warshall all pairs shortest path algorithm to find the shortest path of all pairs of the actor nodes in the WSAN.

3. For use in a wireless sensor-actor network (WSAN) having a topology defined by a plurality of connected sensor and actor nodes, the WSAN being modeled by a weighted graph having a plurality of edges connecting the sensor and actor nodes, a plurality of weights of the graph being assigned to the edges, the weights representing distances of the edges connecting the nodes, a computer software product, comprising a non-transitory storage medium readable by a processor, the non-transitory storage medium having stored thereon a set of instructions for performing a least movement WSAN topology repair method, the set of instructions including:

(a) a first sequence of instructions which, when executed by the processor, causes said processor to use the weights to build a shortest path routing table for each actor node in the WSAN, thereby allowing each of the actor nodes to be aware of an entire topography of the WSAN, wherein no constraints are applied to path lengths between pairs of actor nodes;
 (b) a second sequence of instructions which, when executed by the processor, causes said processor to determine whether a neighbor actor node of the actor node has failed;
 (c) a third sequence of instructions which, when executed by the processor, causes said processor to determine whether a failed neighbor actor node is a cut-vertex node;
 (d) a fourth sequence of instructions which, when executed by the processor, causes said processor to use the shortest path routing table to determine a failure replacement best candidate actor node for the failed neighbor actor node if the failed neighbor actor node is the cut-vertex node by recursively identifying a smallest block of the WSAN topology from which the best candidate actor node is selected for replacement of the failed neighbor actor node;
 (e) a fifth sequence of instructions which, when executed by the processor, causes said processor to notify all child nodes belonging to the best candidate actor node when the best candidate actor node is moving to replace the failed neighbor actor node;
 (f) a sixth sequence of instructions which, when executed by the processor, causes said processor to move the best candidate actor node to a locus proximate the failed cut-vertex node, thereby replacing the failed cut-vertex node; and
 (g) a seventh sequence of instructions which, when executed by the processor, causes said processor to broadcast a node-recovered message to the remaining actor nodes in the WSAN.

4. The computer software product according to claim 3, further comprising an eighth sequence of instructions which, when executed by the processor, causes said processor to use a Floyd-Warshall all pairs shortest path algorithm to find the shortest path of pairs of the actor nodes in said WSAN.

* * * * *